(12) United States Patent
Koreeda et al.

(10) Patent No.: US 7,149,401 B2
(45) Date of Patent: Dec. 12, 2006

(54) OPTICAL FIBER CONNECTOR DISASSEMBLING TOOL

(75) Inventors: Yuichi Koreeda, Tokyo (JP); Makoto Sanguu, Tokyo (JP); Kiyoyuki Mutaguchi, Tokyo (JP); Yoshiteru Abe, Kanagawa (JP); Masaru Kobayashi, Kanagawa (JP); Ryou Nagase, Tokyo (JP)

(73) Assignees: Japan Aviation Electronics Industry, Limited, Tokyo (JP); Nippon Telegraph and Telephone Corporation, Tokyo (JP)

( * ) Notice: Subject to any disclaimer, the term of this patent is extended or adjusted under 35 U.S.C. 154(b) by 180 days.

(21) Appl. No.: 10/954,667

(22) Filed: Sep. 30, 2004

(65) Prior Publication Data

US 2005/0084225 A1    Apr. 21, 2005

(30) Foreign Application Priority Data

Oct. 1, 2003    (JP)    ............................. 2003/343519

(51) Int. Cl.
*G02B 6/00*    (2006.01)
(52) U.S. Cl. ........................ 385/137; 385/136; 385/134
(58) Field of Classification Search ................ 385/134, 385/135, 136, 137, 139, 53, 76, 77
See application file for complete search history.

(56) References Cited

U.S. PATENT DOCUMENTS

| | | | | |
|---|---|---|---|---|
| 4,842,363 A | * | 6/1989 | Margolin et al. | ............. 385/84 |
| 5,146,813 A | * | 9/1992 | Stanfill, Jr. | .................. 81/120 |
| 6,298,190 B1 | * | 10/2001 | Waldron et al. | ............ 385/134 |
| 2001/0019654 A1 | * | 9/2001 | Margolin et al. | ........... 385/134 |
| 2005/0067847 A1 | * | 3/2005 | Zellak | ........................ 294/100 |
| 2005/0226567 A1 | * | 10/2005 | Koreeda et al. | ............. 385/59 |

FOREIGN PATENT DOCUMENTS

JP    9096734    4/1997    ............ 385/134 X

* cited by examiner

*Primary Examiner*—Brian M. Healy
(74) *Attorney, Agent, or Firm*—Collard & Roe, P.C.

(57) ABSTRACT

A disassembling tool includes a holding block having a housing portion for accommodating a plug connector, a slide block, and a handling part for sliding the slide block. The plug connector comprises an outer member and a plug frame and is accommodated in the housing portion of the holding block. When turning a handle of the handling part, the slide block is slidably moved so that projections provided on the slide block release the locking between locking portions of the outer member and locked portions of the plug frame. Following this, contact portions provided on the slide block come into contact with the plug frame so as to push it out of the outer member by a given amount.

7 Claims, 14 Drawing Sheets

OPTICAL FIBER CONNECTOR DISASSEMBLING TOOL

This application claims priority to prior Japanese patent application JP 2003-343519, the disclosure of which is incorporated herein by reference.

BACKGROUND OF THE INVENTION

The present invention relates to a tool for disassembling an optical fiber connector.

Referring to FIG. 1 through FIG. 5, descriptions will be given below of an optical fiber connector and an optical fiber connector disassembling tool for disassembling the same. This type of an optical fiber connector disassembling tool is disclosed in Japanese Patent Application Publication (JP-A) No. 9-96734, for example.

FIG. 1 and FIG. 2 show an optical fiber connector 21. The optical fiber connector 21 includes a rod-like base 22 in a long and narrow shape and a pressing cover 23 which is attached onto an upper side of the base 22. Between the base 22 and the pressing cover 23 is held a pair of optical fibers 24 with each one end of the fibers butted against each other into connection. The base 22 has a pair of walls 25 along the longitudinal direction. The pressing cover 23 is fitted between the pair of walls 25. Thereby, the pair of optical fibers 24 is held between the base 22 and the pressing cover 23. On each side of the walls 25 along the longitudinal direction between the base 22 and the pressing cover 23, two insertion holes 28 to be used for detaching the cover 23 from the base 22 are formed respectively. Fitting the pressing cover 23 to the base 22 holds the pair of optical fibers 24 placed therebetween, and detaching the pressing cover 23 from the base 22 releases the optical fibers 24 therefrom.

FIG. 3 through FIG. 5 show an optical fiber connector disassembling tool 31. In FIG. 3 through FIG. 5, the optical fiber connector disassembling tool 31 includes two shafts 32 oppositely disposed in parallel, a pair of supporting blocks 33 and 34, two pairs of engaging pawls 37 and a lever 43. The two shafts 32 are used to move the supporting block 34 closer to and apart from the supporting block 33. The two pairs of engaging pawls 37 are formed on the supporting blocks 33 and 34 respectively such that two pairs of engaging pawls 37 project from opposite faces 35 and 36 of the supporting blocks 33 and 34. These two pairs of engaging pawls 37 are inserted into insertion holes 28 provided on each side of an optical fiber connector 21 that is disposed between the supporting blocks 33 and 34 so that the engaging pawls 37 are engaged with the pressing cover 23. Between the supporting blocks 33 and 34, a movement space 38 is formed to allow the base 22 to be movable in the detaching direction (i.e. the lower direction shown in FIG. 4 and FIG. 5) from the pressing cover 23 supported by the engaging pawls 37.

The two shafts 32 are movably inserted in two insertion through holes 39a that are bored on the supporting block 33 fixed in place. Further, two insertion through holes 39b are bored on the supporting block 34 so as to insert the two shafts 32 therein as well. The shafts 32 have a sufficiently longer length than the longitudinal length of the insertion through holes 39a so that the portions of the shafts 32 through and projecting from the supporting block 33 are long enough to be inserted in the insertion through holes 39b formed on the supporting block 34. The supporting block 34 is fixed at front ends 40 of the shafts 32, that is, the supporting block 34 is detachably fixed to the front ends 40 of the shafts 32 by fixing screws 41. The lever 43 is detachably fixed to base ends 42 of the shafts 32 by fixing screws 44. The lever 43 is used to move the supporting block 34 closer to and apart from the supporting block 33.

As shown in FIG. 5, at the intermediate position between the two shafts 32, there is disposed a coil spring 45, which generates urging force to pull the supporting block 34 toward the supporting block 33. The each end of the coil spring 45 is connected to the supporting blocks 33 and 34 respectively.

The pair of engaging pawls 37 projecting out of the opposite face 35 of the supporting block 33 are projecting portions formed on a pawl supporting plate 47 that is fixed onto the supporting block 33 by a pair of two screws 46. Similarly, other pair of engaging pawls 37 projecting out of the opposite face 36 of the supporting block 34 are projecting portions formed on another pawl supporting plate 47 that is fixed onto the supporting block 34 by another pair of two screws 46.

The optical fiber connector disassembling tool 31 is used to disassemble the optical fiber connector 21 with being held between the supporting blocks 33 and 34. The following procedures are taken to hold the optical fiber connector 21 between the supporting blocks 33 and 34.

Since the coil spring 45 applies a constant urging force on the supporting block 34 to move toward the supporting block 33, pushing the lever 43 toward the supporting block 34 brings the supporting block 34 apart from the supporting block 33 so that the movement space 38 is formed between the supporting blocks 33 and 34, where the optical fiber connector 21 is inserted with the base 22 down. Then, pressing force by the lever 43 is released and the engaging pawls 37 are inserted in the insertion holes 28 of the optical fiber connector 21. Accordingly, the engaging pawls 37 fix the optical fiber connector 21 in place. Simultaneously, a clearance is secured between the base 22 and the shafts 32 so that the base 22 can be movable when detached from the pressing cover 23.

Following the above step of holding the optical fiber connector 21 between the supporting blocks 33 and 34, the base 22 is pressed downward at both longitudinal ends thereof to be brought apart from the pressing cover 23. At this time, the base 22 moved downward comes into contact with the two shafts 32, whereby the base 22 is supported.

After completion of moving the base 22 apart from the pressing cover 23, the lever 43 is pressed to move the supporting block 34 apart from the supporting block 33, so that the optical fiber connector 21 can be easily taken out of the optical fiber connector disassembling tool 31.

For a tool for disassembling an optical fiber connector, optical fiber connector disassembling tools as described above have been proposed. However, there has not been proposed any disassembling tool for an optical fiber connector comprising an outer member and a plug frame to be inserted therein and pushed out thereof.

SUMMARY OF THE INVENTION

The object of the present invention is to provide an optical fiber connector disassembling tool with easy handling and a simple structure.

An optical fiber connector disassembling tool according to the present invention is applied to an optical fiber connector comprising an outer member, a plug frame to be inserted therein and pushed out thereof, locking portions formed on either one of the outer member or the plug frame, and locked portions formed on the other of the outer member or the plug frame, for the sake of locking between the outer member and the plug frame.

According to an aspect of the present invention, the disassembling tool has a slide block on which projections are provided in order to release the locking between the locking portions and the locked portions.

The disassembling tool comprises a holding block having a housing portion for accommodating the optical fiber connector, a slide block, a handling part for sliding the slide block, and a body part for holding the holding block, the slide block and the handling part.

The slide block is slidably held to the body part. The handling part slides the slide block so that the slide block moves to a position at which the projections thereof release the locking between the locking portions and the locked portions.

The slide block preferably has contact portions that come into contact with the plug frame to push it out of the outer member after releasing the locking between the locking portions and the locked portions.

Either of the locking portions or the locked portions are preferably formed of elastically deformable member.

An outlet of the housing portion preferably has such a width as is smaller than the width of the outer member and greater than the width of the plug frame.

The handling part comprises a handle rotatable about a supporting axis, and an intermediate mechanism having an axis moving in a linear motion to which a rotary motion of the handle is converted. The slide block is connected to the axis so that the slide block moves linearly cooperating with the linear motion of the axis.

DESCRIPTION OF THE PREFERRED EMBODIMENT

Referring to FIG. 6 through FIG. 16, descriptions will be given below of an optical fiber connector disassembling tool according to an embodiment of the present invention.

Figure 1:
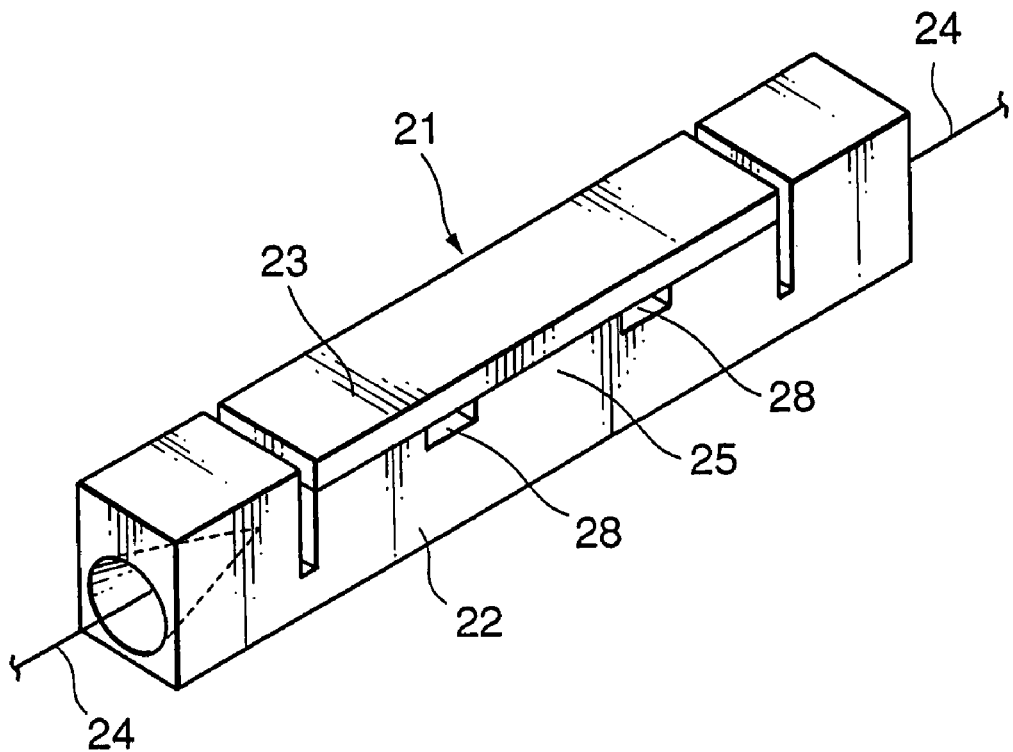
FIG. 1 is an enlarged perspective view showing a conventional optical fiber connector.
Figure 2:
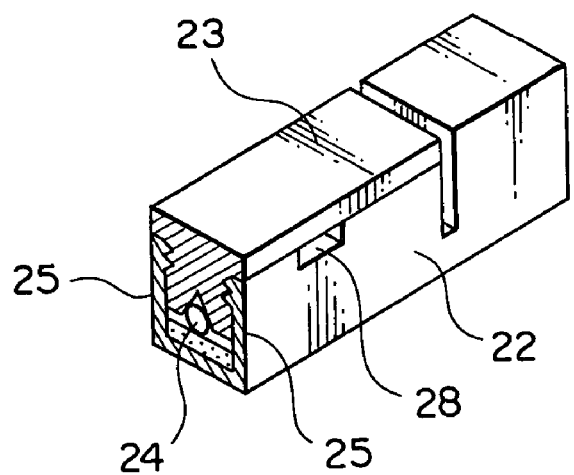
FIG. 2 is a perspective view showing the broken optical fiber connector of FIG. 1.
Figure 3:
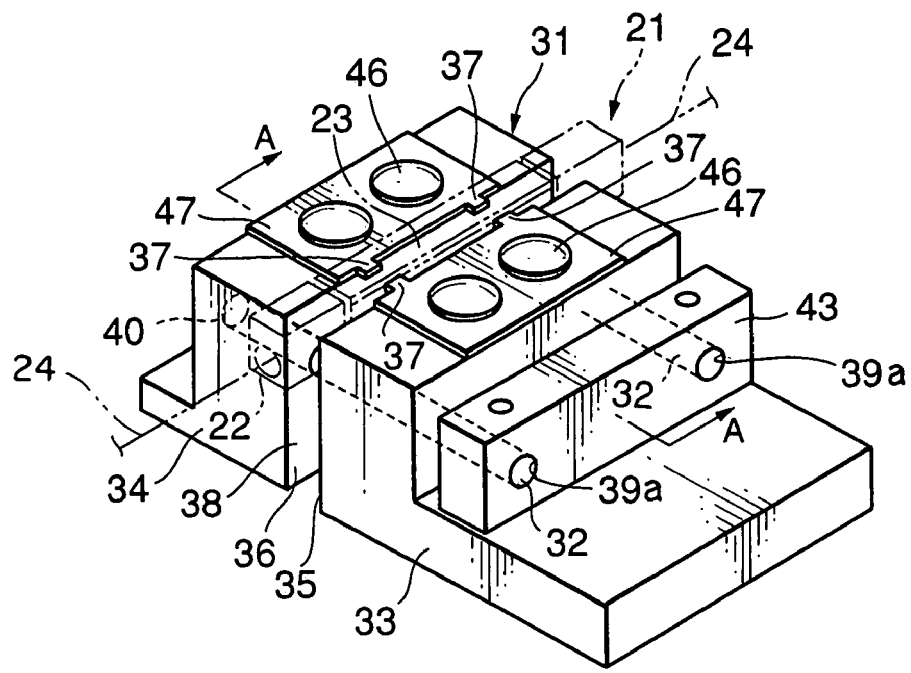
FIG. 3 is a perspective view showing a conventional optical fiber connector disassembling tool.
Figure 4:
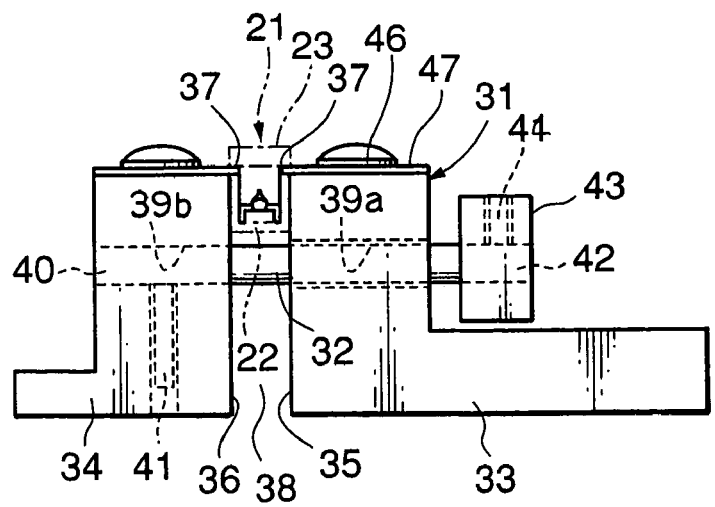
FIG. 4 is a front view of the optical fiber connector disassembling tool shown in FIG. 3.
Figure 5:
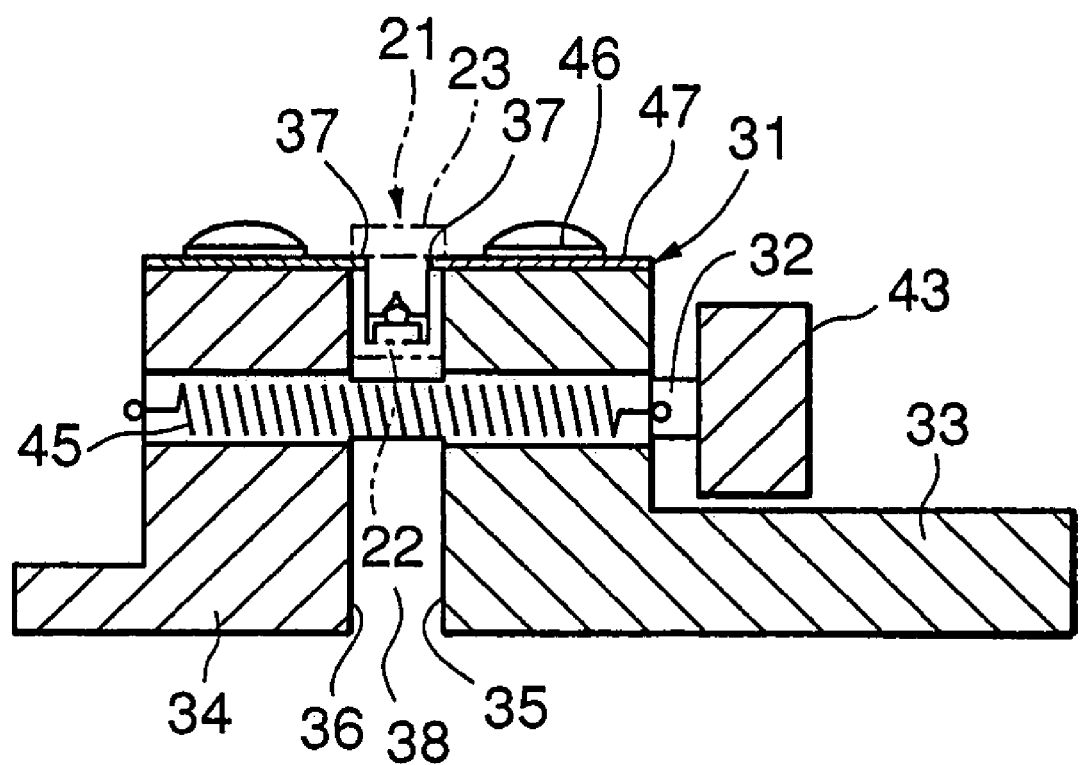
FIG. 5 is a cross-sectional view along the line A—A of the optical fiber connector disassembling tool shown in FIG. 3.
Figure 6:
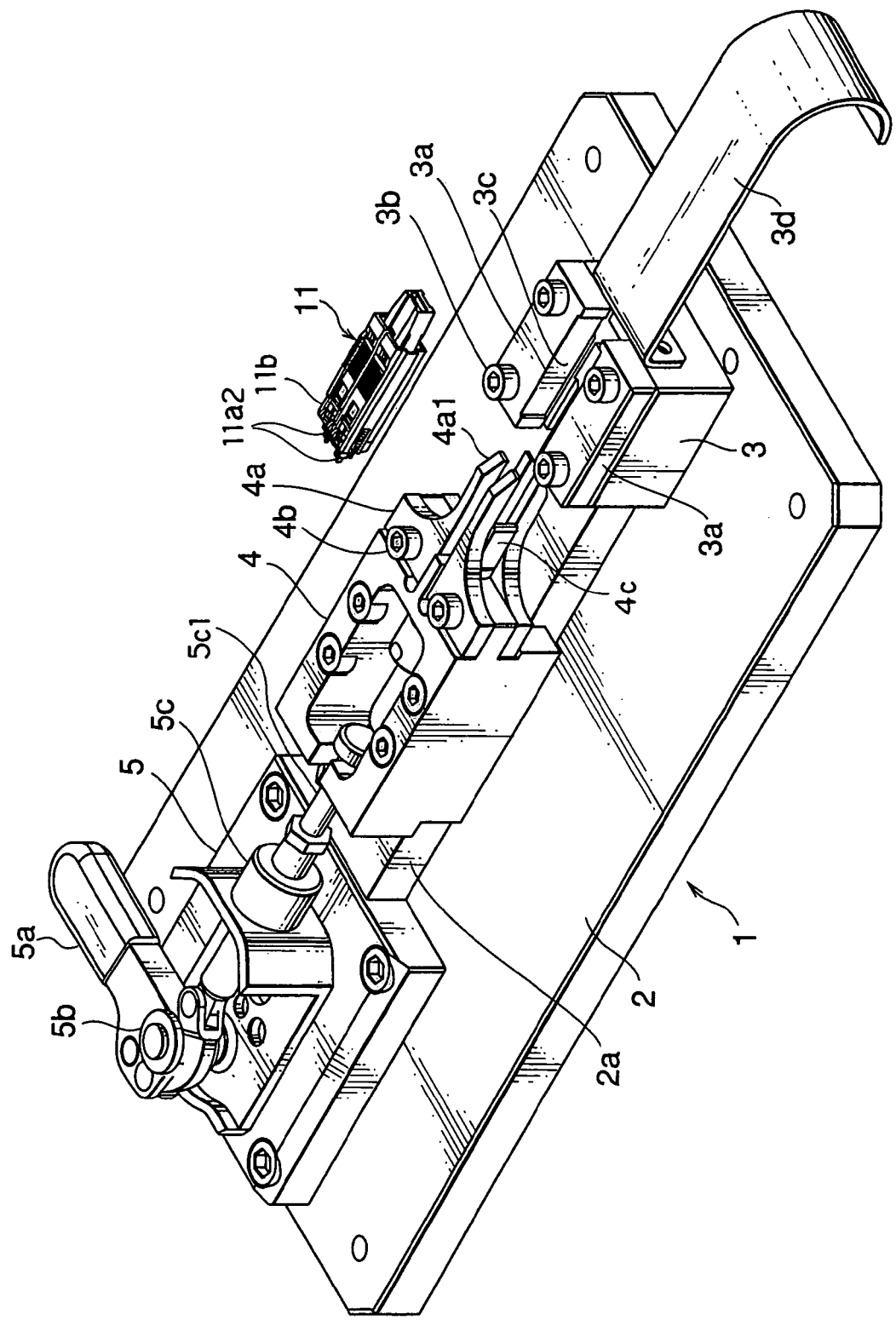
FIG. 6 is a perspective view of an optical fiber connector disassembling tool according to an embodiment of the present invention and a plug connector to be disassembled thereby.

FIG. 6 is a perspective view showing a disassembling tool 1 and a plug connector (i.e. an optical fiber connector) 11 to be disassembled by the disassembling tool 1.

The disassembling tool 1 comprises a rectangular plate-shaped body part 2, a holding block 3 fixed onto the body part 2, a rail 2a provided onto the surface of the body part 2, a slide block 4 slidably moving over the rail 2a, and a handling part 5 for sliding the slide block 4.

A pair of rectangular plates 3a, 3a are fixed onto the upper face of the holding block 3 by two pairs of screws 3b, 3b respectively. Intermediate space between the pair of plates 3a, 3a is a housing portion 3c for accommodating the plug connector 11. A curved guide plate 3d for guiding a cord connected from the plug connector 11 is fixed at the center of one side face of the holding block 3.

Figure 8:
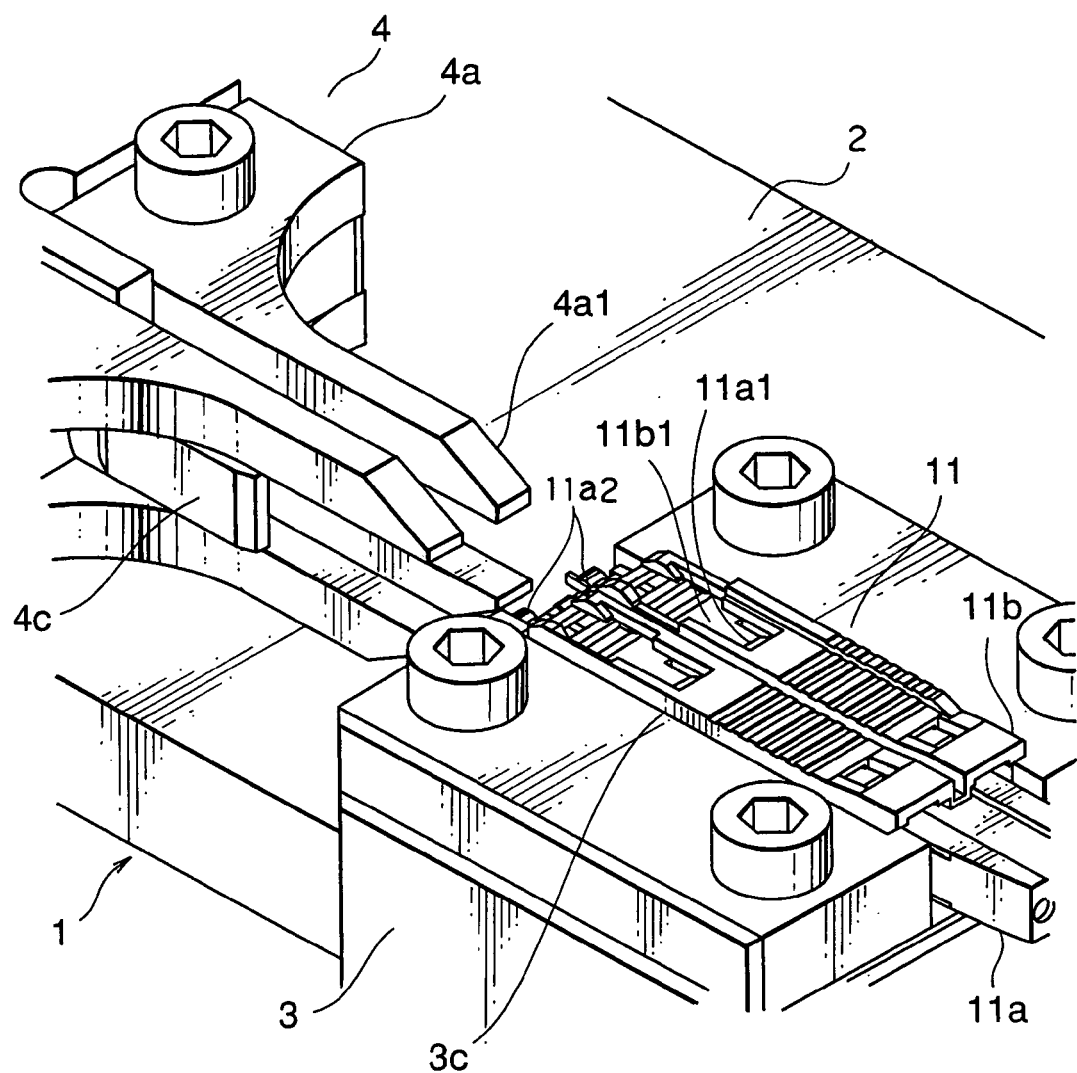
FIG. 8 is an enlarged perspective view of the housing portion, the vicinity thereof and the plug connector in FIG. 7.
Figure 16:
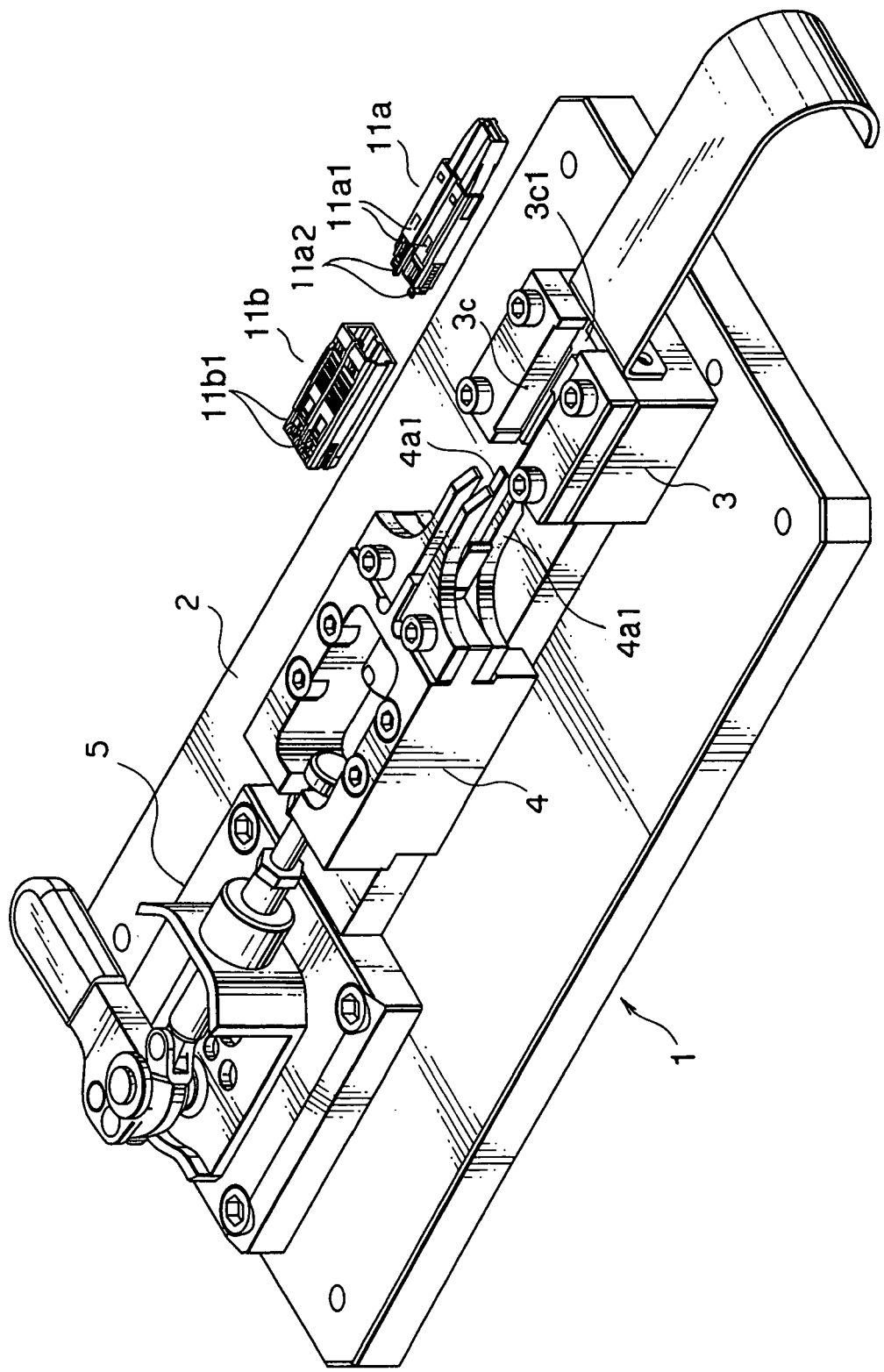
FIG. 16 is a perspective view showing the state in which the plug frame and the outer member of FIG. 15 are disassembled each other.

Referring to FIG. 16, descriptions will be given of the plug connector 11 in a disassembled state, for the sake of convenience. The plug connector 11 comprises a quadrangular plug frame 11a and a quadrangular cylindrical outer member 11b for accommodating insertion of the plug frame 11a. The plug frame 11a has two pairs of locked portions 11a1, each of which is provided on both upper and lower faces of the plug frame 11a respectively (the upper face is illustrated only, but more details on that later). On the other hand, the outer member 11b has two pairs of locking portions 11b1, each of which is elastically deformable in the vertical direction and provided on both upper and lower faces of the outer member 11b respectively (the upper face is illustrated only, but more details on that later). Each locked portion 11a1, as shown in FIG. 8, is locked to its corresponding locking portion 11b1 by means of a hook structure or the like. Substituting for the locking portions 11b1, the locked portions 11a1 may be formed of elastically deformable material.

As shown in FIG. 16, two projecting portions 11a2 are provided at the front end of the plug frame 11a. The plug connector 11, as illustrated in FIG. 6, is constituted such that the two projecting portions 11a2 of the plug frame 11 a are projecting out of the outer member 11b when the plug frame 11a is mounted in the outer member 11b.

The housing portion 3c of the holding block 3 has such a width as is great enough to accommodate the plug connector 11, but becomes a little smaller at least at an outlet shown as 3c1 of either of the longitudinal ends thereof. In other words, the outer member 11b has a greater width than the width of the outlet 3c1 of the housing portion 3c, and the plug frame 11a has a smaller width than the width of the outlet 3c1 of the housing portion 3c. This prevents the outer member 11b from displacing in the longitudinal direction within the housing portion 3c while the plug connector 11 is accommodated in the housing portion 3c. Further, the plug connector 11 is accommodated in a manner where a slight clearance is secured between the lower face of the plug connector 11 and the bottom face of the housing portion 3c as if the plug connector 11 is floating in the housing portion 3c. This enables an insertion of lower two projections 4a1 of the slide block 4 (more details on that later) into the clearance between the lower face of the plug connector 11 and the bottom face of housing portion 3c.

Referring again to FIG. 6, four disassembling members 4a are fixed by two screws 4b, 4b in vertical and bilateral symmetry to the opposite side of the slide block 4, opposing to the holding block 3. Two sets of the upper and the lower disassembling members 4a respectively have a contact portion 4c (one of two is illustrated only) between the upper and the lower members 4a, so that the disassembling members 4a can push the plug frame 11a (FIG. 16) out of the outer member 11b when the contact portions 4c come into contact with the projecting portions 11a2.

Figure 7:
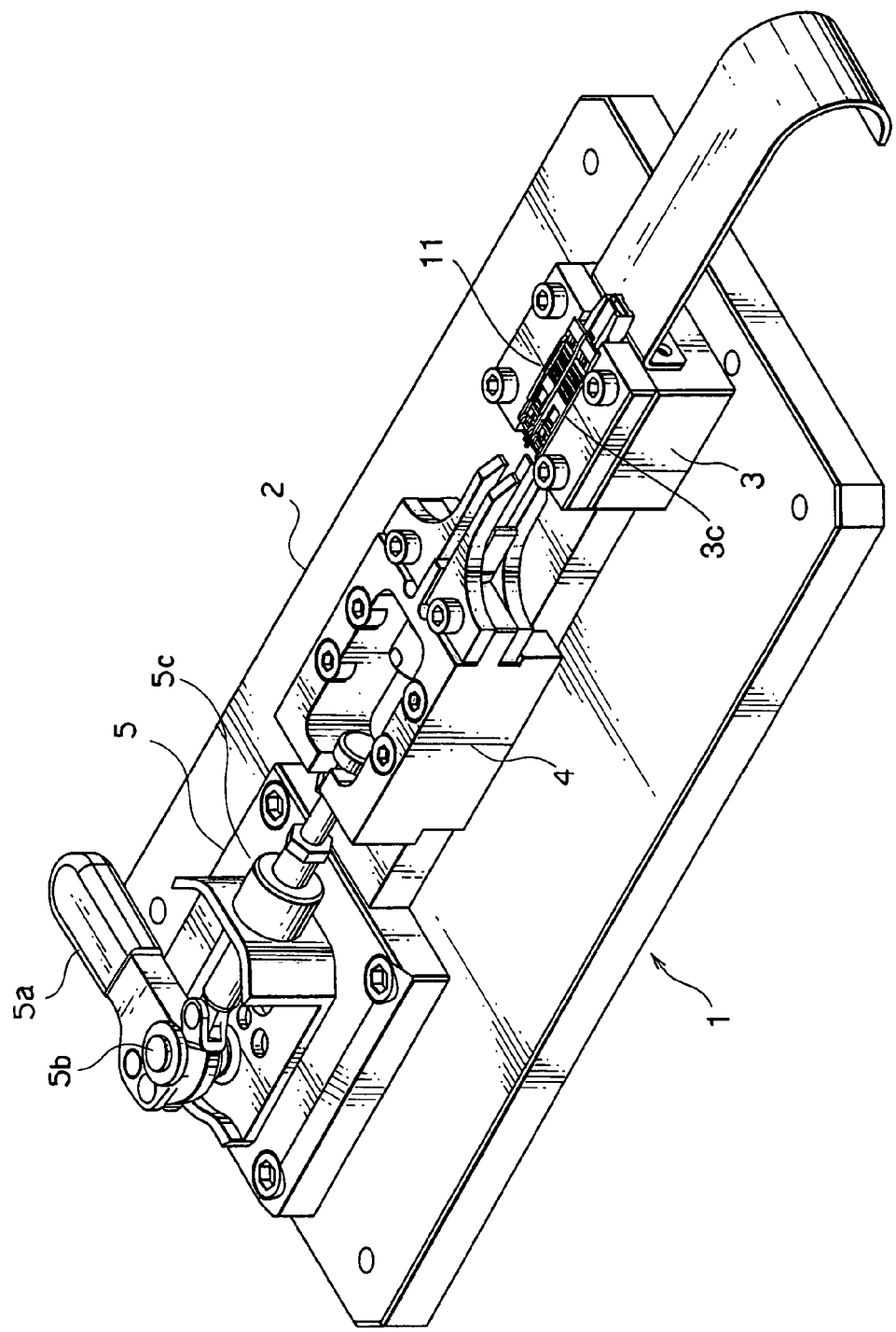
FIG. 7 is a perspective view showing the state in which the plug connector of FIG. 6 is accommodated in the housing portion of the disassembling tool.

FIG. 7 is a perspective view of the disassembling tool 1, showing the state in which the plug connector 11 is accommodated in the housing portion 3c.

FIG. 8 is an enlarged perspective view of the housing portion 3c, the vicinity thereof and the plug connector 11 in FIG. 7.

Figure 9:
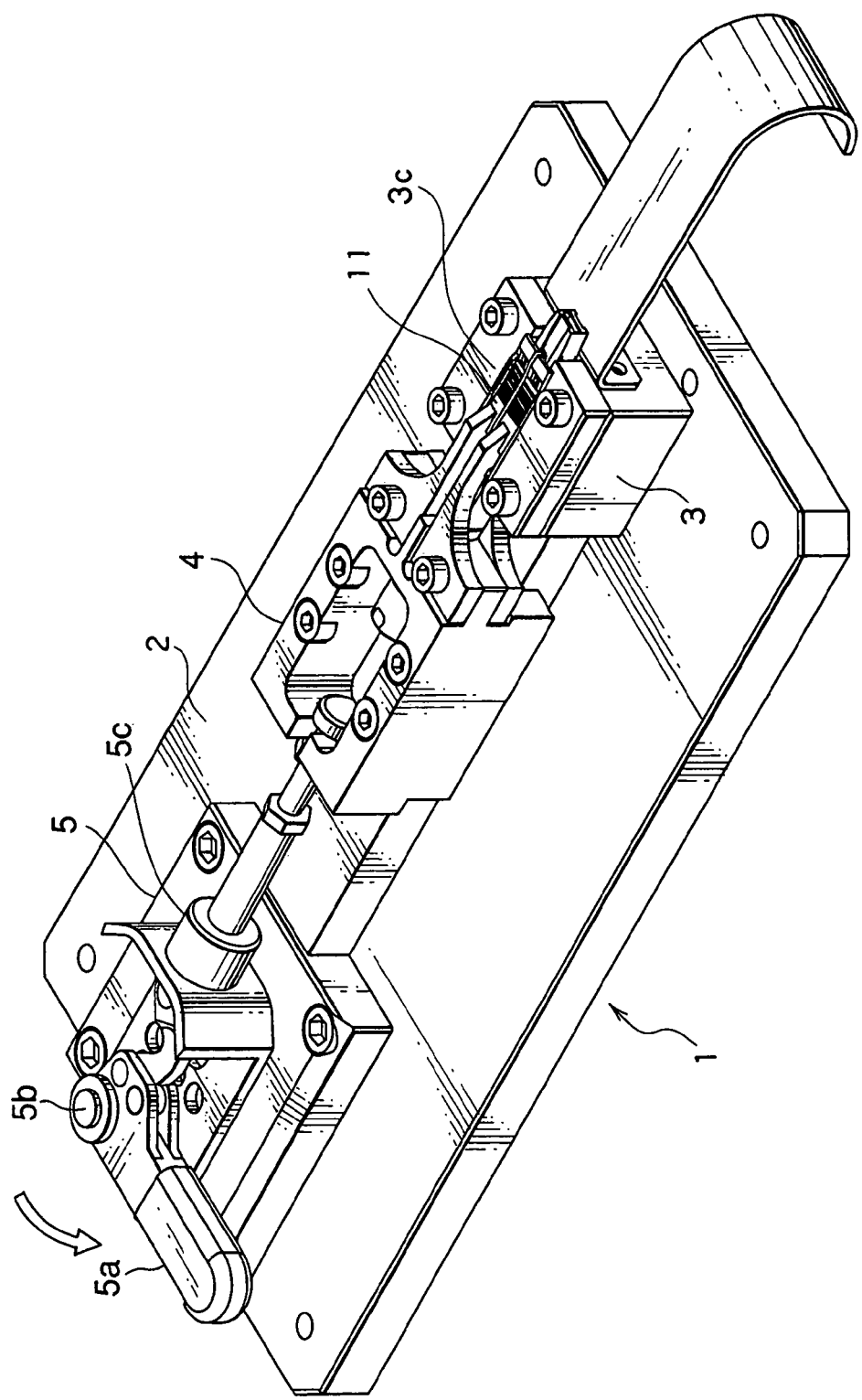
FIG. 9 is a perspective view showing the state in which the plug frame of the plug connector in FIG. 7 is being pushed out of the outer member.

FIG. 9 is a perspective view showing the state in which a handle 5a of the handling part 5 of FIG. 7 is being turned anti-clockwise about a support axis 5b.

Figure 10:
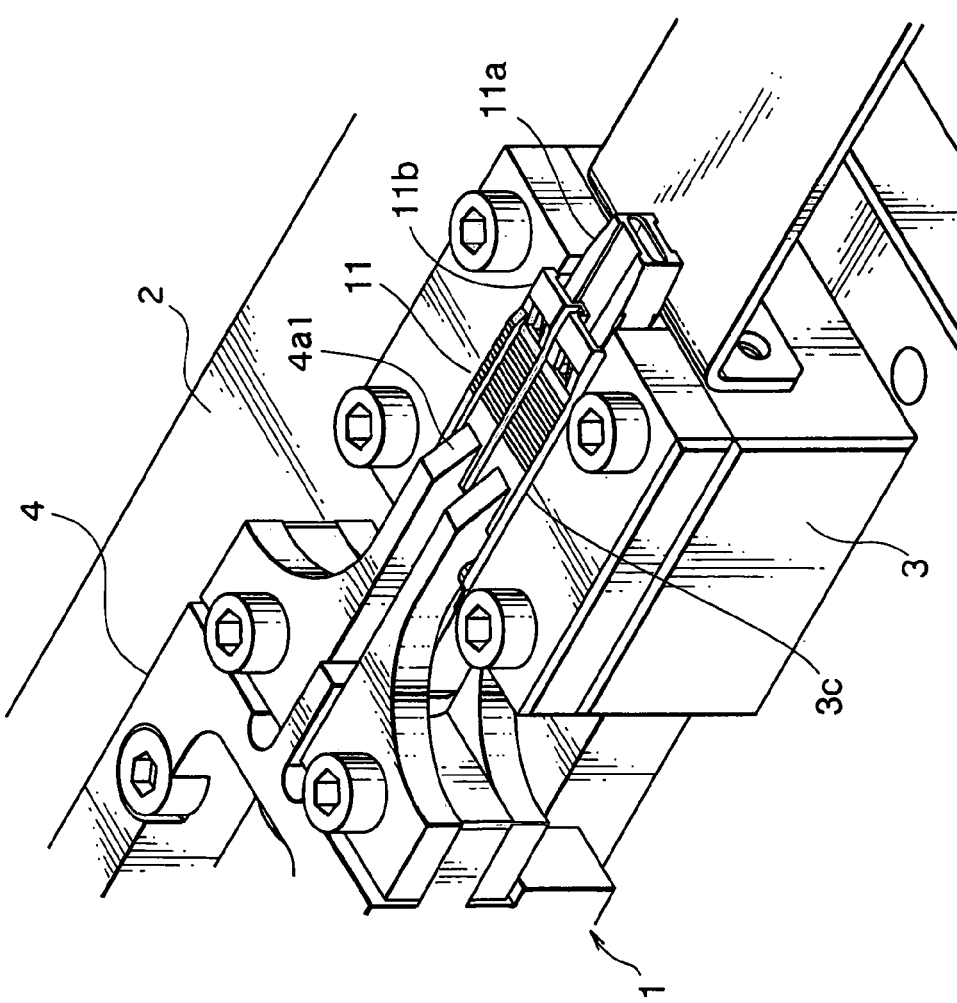
FIG. 10 is an enlarged perspective view of the housing portion, the vicinity thereof and the plug connector in FIG. 9.

FIG. 10 is an enlarged perspective view of the housing portion 3c, the vicinity thereof and the plug connector 11 in FIG. 9.

The handling part 5 comprises a handle 5a rotatable about the supporting axis 5b, and an intermediate mechanism 5c having an axis 5c1 moving in a linear motion to which a rotary motion of the handle 5a is converted. The slide block 4 is connected to the axis 5c1 so that the slide block 4 linearly moves over the rail 2a cooperating with the linear motion of the axis 5c1.

Turning the handle 5a anti-clockwise brings the axis 5c1 of the intermediate mechanism 5c to push the slide block 4, whereby each projection 4a1 of the four disassembling members 4a presses its corresponding locking portion 11b1 of the outer member 11b. This operation releases each locked portion 11a1 of the plug frame 11a from its corresponding locking portion 11b1 of the outer member 11b.

Figure 11:
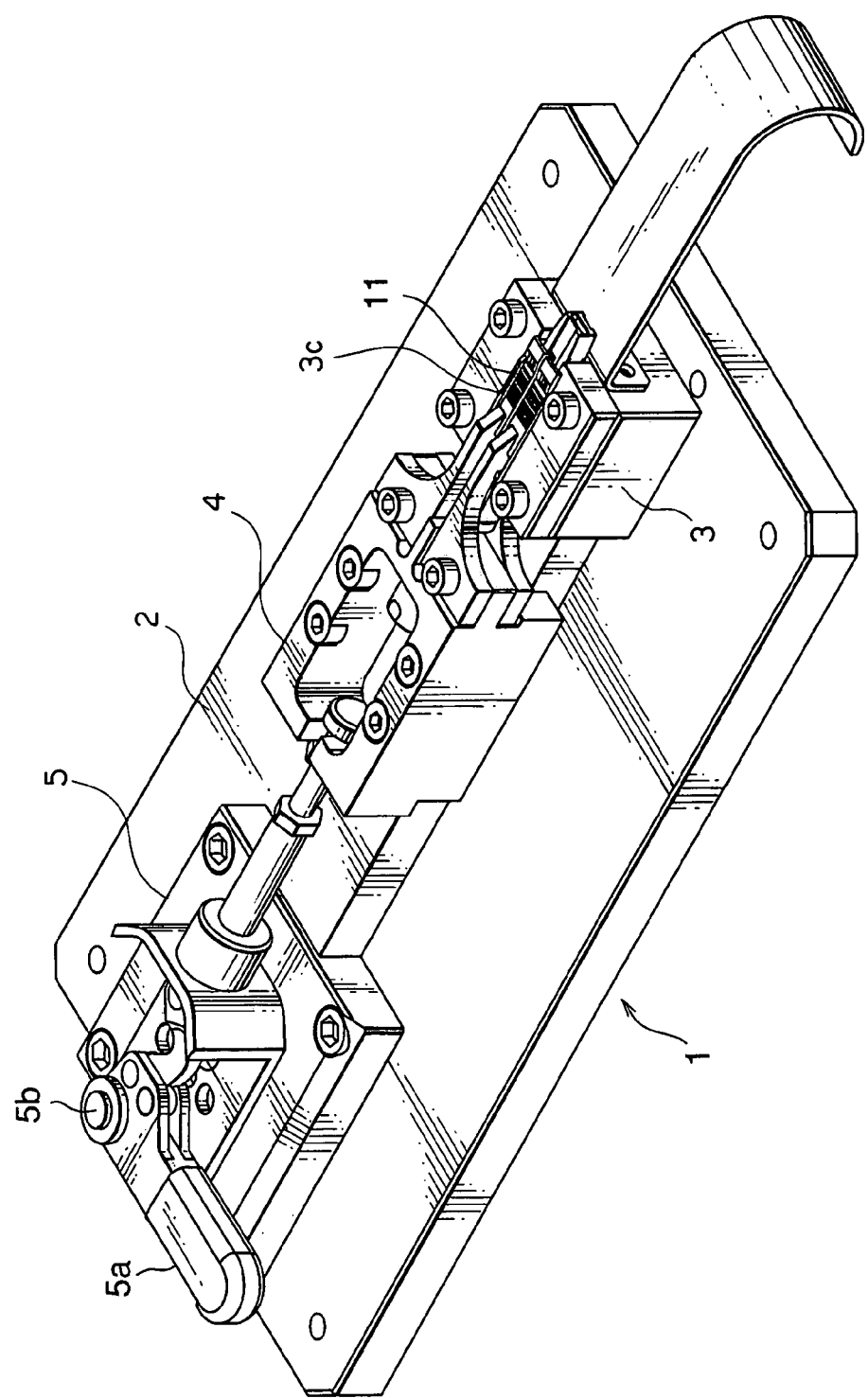
FIG. 11 is a perspective view showing the state in which the plug frame is pushed out of the outer member.
Figure 12:
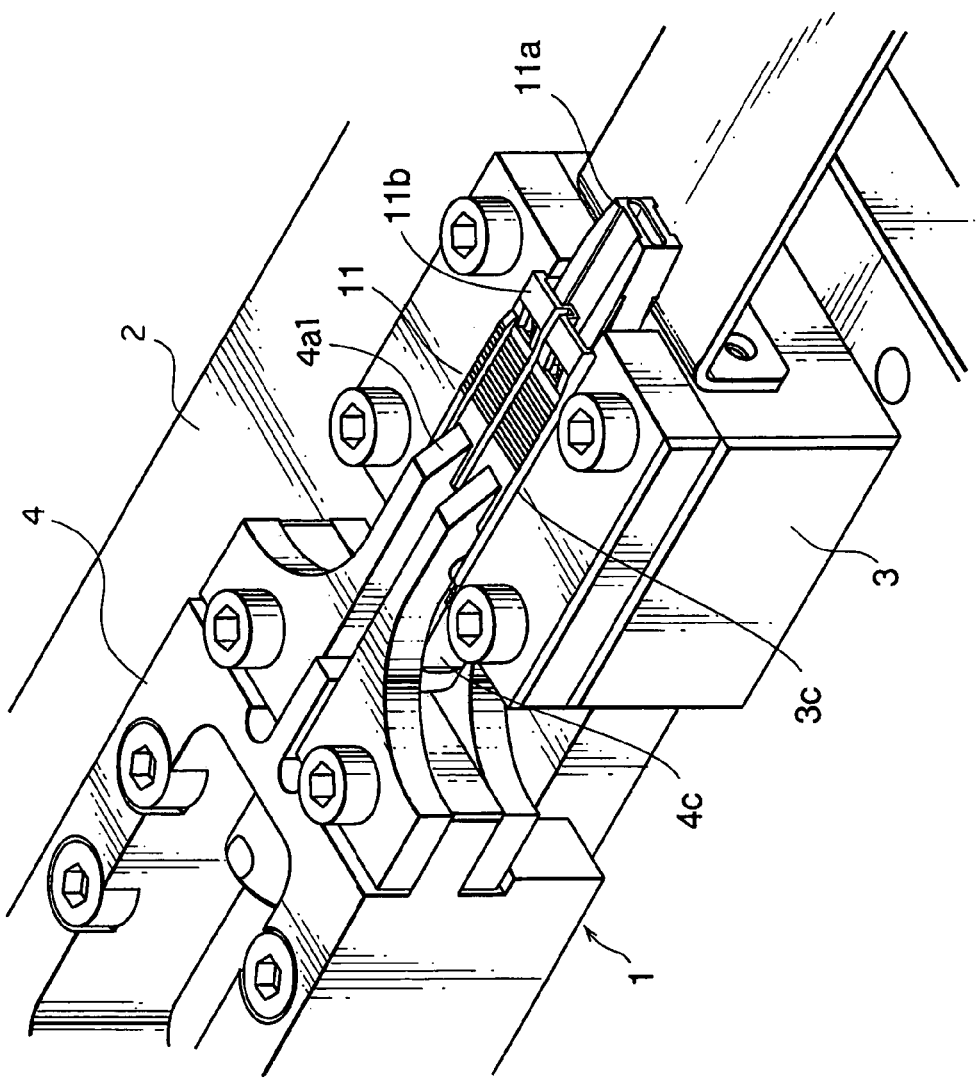
FIG. 12 is an enlarged perspective view of the housing portion, the vicinity thereof and the plug connector in FIG. 11.

FIG. 11 is a perspective view showing the state in which the handle 5a in FIG. 7 is fully turned anti-clockwise about the support axis 5b. FIG. 12 is an enlarged perspective view of the housing portion 3c, the vicinity thereof and the plug connector 11 in FIG. 11. In this state, the plug frame 11a has been pushed at the two projecting portions 11a2 by the two contact portions 4c of the slide block 4, so that the plug frame 11a is pushed out of the outer member 11b by a given amount.

Figure 13:
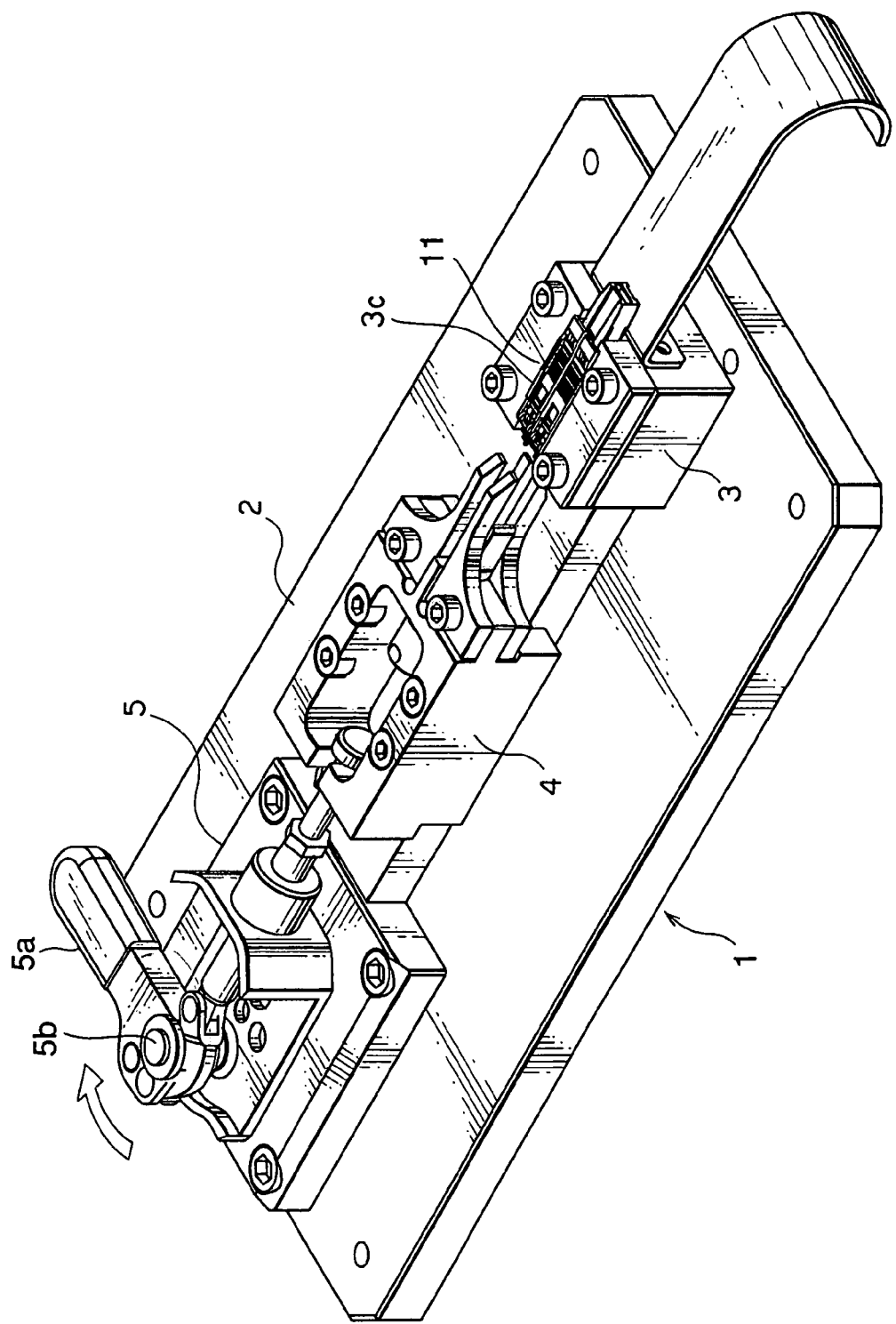
FIG. 13 is a perspective view showing the state in which the handle of a handling part in the state of FIG. 11 is returned to the position of FIG. 7.
Figure 14:
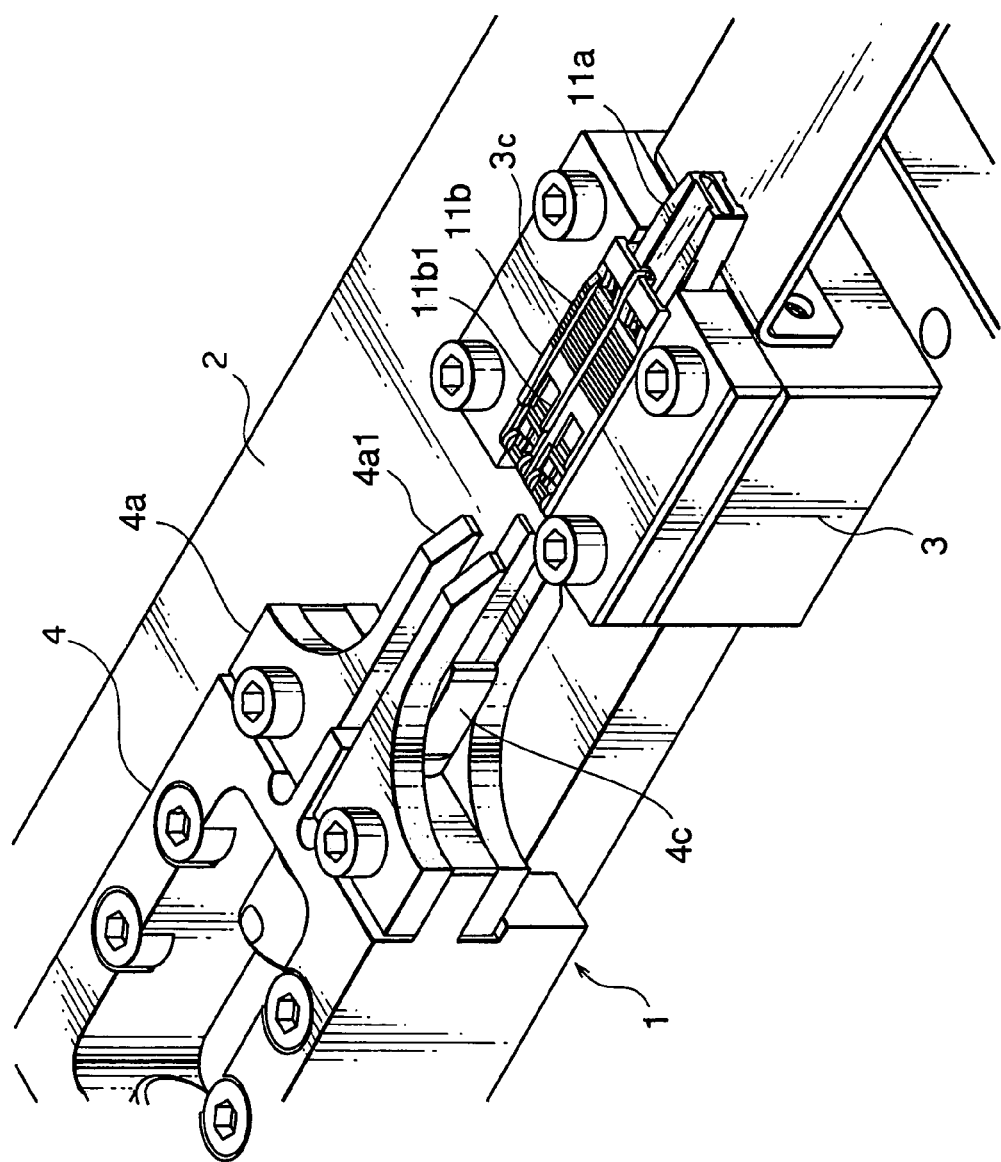
FIG. 14 is an enlarged perspective view of the housing portion, the vicinity thereof and the plug connector in FIG. 13.

FIG. 13 is a perspective view showing the state in which the handle 5a in FIG. 11 is fully returned clockwise about the support axis 5b to the position of FIG. 7. FIG. 14 is an enlarged perspective view of the housing portion 3c, the vicinity thereof and the plug connector 11 of FIG. 13, wherein each projection 4a1 of the four disassembling members 4a is apart from its corresponding locking portion 11b1 of the outer member 11b.

Figure 15:
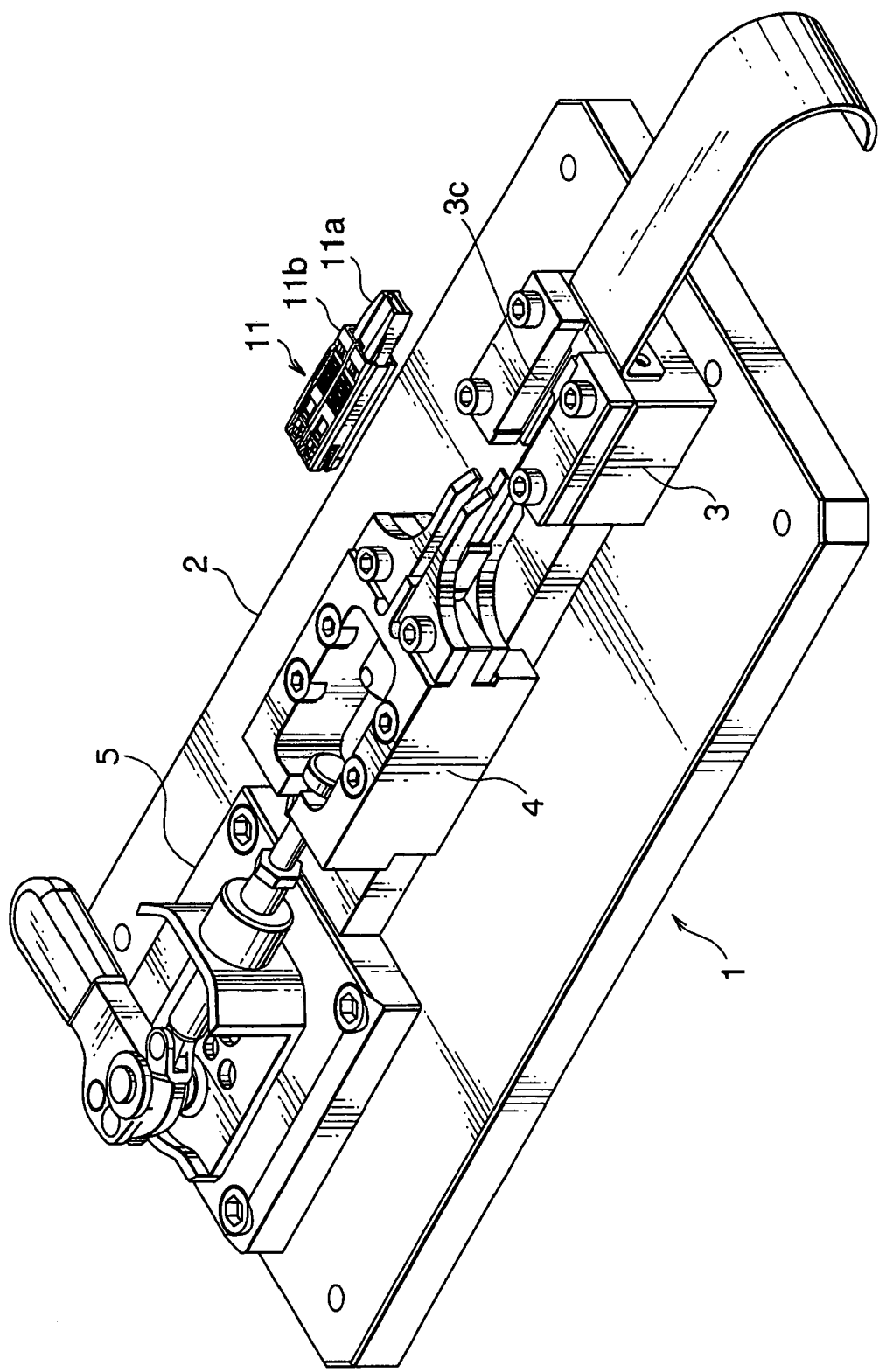
FIG. 15 is a perspective view showing the state in which the plug connector of FIG. 13 taken out of the housing portion is placed in the vicinity of the disassembling tool.

FIG. 15 is a perspective view showing the state in which the plug connector 11 of FIG. 13, which has been taken out of the housing portion 3c, is placed in the vicinity of the body part 2. In this state, the plug frame 11a, as mentioned above, is pushed out of the outer member 11b by the given amount.

FIG. 16 illustrates the state in which the plug frame 11a is completely drawn out of the outer member 11b by fingers so that the plug frame 11a and the outer member 11b are disassembled each other.

As is obvious in the above descriptions, the following advantageous effects can be obtained according to the present invention.

1. A simple handling of sliding a slide block enables release of the locking between an outer member and a plug frame of an optical fiber connector which is accommodated in a housing portion of a holding block.

2. A disassembling tool has a simple structure, comprising a holding block having a housing portion for accommodating an optical fiber connector, a sliding block having projections for releasing the locking between locking portions and locked portions of the connector, a handling part for sliding the slide block and a body part for holding the holding block, the slide block and the handling part.

While this invention has thus far been described with reference to the preferred embodiment thereof, it will be readily possible for those skilled in the art to put this invention into practice in various other manners without departing from the scope of this invention.

The invention claimed is:

1. A disassembling tool for an optical fiber connector comprising an outer member, a plug frame to be inserted in and pushed out of said outer member, and locking portions formed on either one of said outer member or said plug frame and locked portions formed on the other of said outer member or said plug frame, both of said locking portions and said locked portions being provided for the sake of locking between said outer member and said plug frame, wherein:
said disassembling tool comprises a slide block on which projections are provided to release the locking between said locking portions and said locked portions.

2. A disassembling tool for an optical fiber connector as claimed in claim 1, wherein said disassembling tool comprises a holding block having a housing portion for accommodating said optical fiber connector, said slide block, a handling part for sliding said slide block, and a body part for holding said holding block, said slide block and said handling block.

3. A disassembling tool for an optical fiber connector as claimed in claim 2, wherein said slide block is slidably held to said body part, said handling part sliding said slide block so that said projections of the slide block are moved to the position to release the locking between said locking portions and said locked portions.

4. A disassembling tool for an optical fiber connector as claimed in claim 3, wherein said slide block has contact portions to come into contact with said plug frame so as to push said plug frame out of said outer member, following release of the locking between said locking portions and said locked portions.

5. A disassembling tool for an optical fiber connector as claim in claim 1, wherein either of said locking portions or said locked portions are formed of elastically deformable material.

6. A disassembling tool for an optical fiber connector as claimed in claim 2, wherein an outlet of said housing portion has such a width as is smaller than the width of said outer member and greater than the width of said plug frame.

7. A disassembling tool for an optical fiber connector as claimed in claim 3, wherein said handling part comprises a handle rotatable about a support axis, and an intermediate mechanism having an axis moving in a linear motion to which a rotary motion of said handle is converted, said slide block being connected to the axis so that said slide block moves linearly cooperating with the linear motion of said axis.

* * * * *

UNITED STATES PATENT AND TRADEMARK OFFICE
CERTIFICATE OF CORRECTION

| | | |
|---|---|---|
| PATENT NO. | : 7,149,401 B2 | Page 1 of 1 |
| APPLICATION NO. | : 10/954667 | |
| DATED | : December 12, 2006 | |
| INVENTOR(S) | : Koreeda et al. | |

It is certified that error appears in the above-identified patent and that said Letters Patent is hereby corrected as shown below:

Column 6, line 61, (Line 2 of Claim 5) change "claim" (first occurrence) to correctly read: --claimed--.

Signed and Sealed this

Twenty-third Day of February, 2010

David J. Kappos
*Director of the United States Patent and Trademark Office*